March 8, 1966 E. G. RAPP 3,239,164
SPACE RADIATOR SYSTEM
Filed May 22, 1961
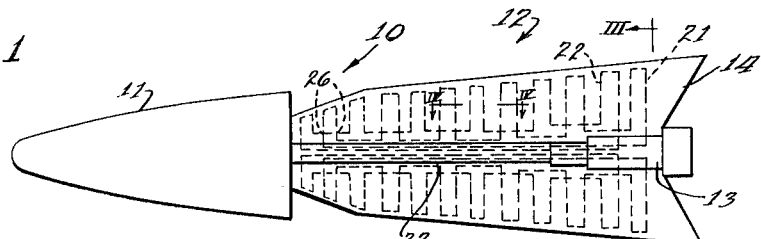
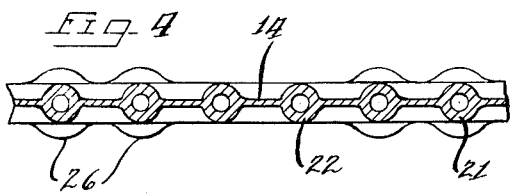
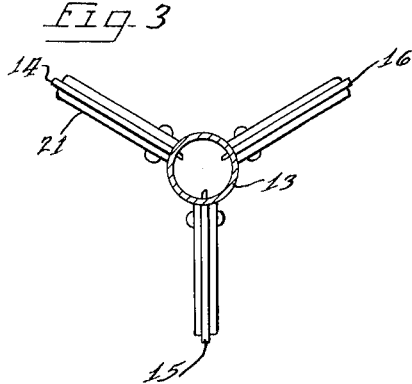
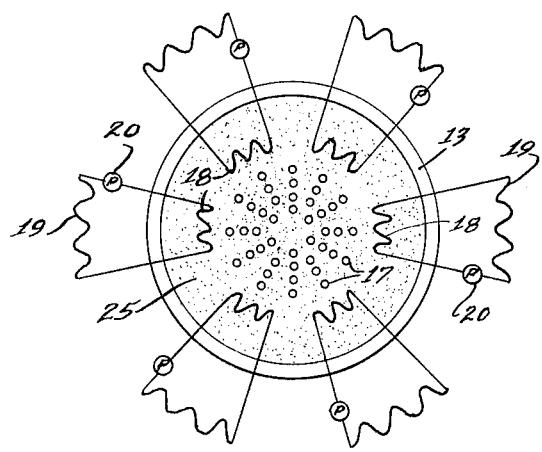
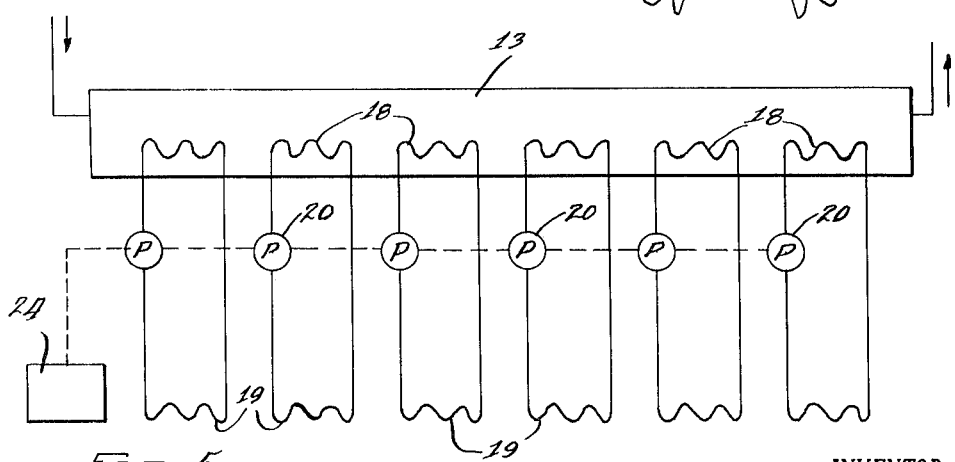
INVENTOR.
Edward G. Rapp
BY
ATTORNEYS

United States Patent Office 3,239,164
Patented Mar. 8, 1966

3,239,164
SPACE RADIATOR SYSTEM
Edward G. Rapp, Lyndhurst, Ohio, assignor to
TRW Inc., a corporation of Ohio
Filed May 22, 1961, Ser. No. 111,652
11 Claims. (Cl. 244—1)

This invention relates to air and space borne vehicles, and is more particularly directed to improved methods and means for dissipating heat generated in an orbiting satellite and the like.

The present day need for a compact, lightweight, long life source of electrical power for space applications is well known in the art. Research and development work in the low and intermediate power ranges is well advanced. However, a present need for electrical power generating units in the megawatt range is present. This requirement particularly arises in the development of high performance electrically propelled vehicles which may be effectively utilized in a wide variety of applications, such as interorbital shuttle, satellite sustainers, lunar and interplanetary travel. The propulsive power requirements for a majority of these applications lie in the range from hundreds of kilowatts to several megawatts.

For such space applications, nuclear and solar powered Rankine cycle heat engines and nuclear and solar plasma diode power plants have been proposed. The Rankine cycle heat engines and power plants employ, as the working fluid, liquid metal vapors, such as mercury vapor, or alkali metals, such as potassium, rubidium, or sodium.

In Rankine cycle engines and heat plants, the working fluid is either directly boiled or indirectly boiled. In other words, a fluid is run into a nuclear reactor or solar boiler, or in heat exchange relation with a nuclear reactor or solar boiler and the heat of the liquid is transferred directly or indirectly to the working fluid. The working fluid is pumped in vapor form to a turbine which operates an electrical alternator. From the turbine, the working fluid is flowed to a condenser for cooling and condensing thereof. Heat may be rejected directly to space from radiating surfaces of the condenser, or may be transferred to an additional fluid which circulates through a radiating heat exchanger, rejecting heat to space in this manner. From the condenser, the working fluid is then recycled in contact or heat exchange relation with the energy source from the nuclear reactor or solar boiler.

The present invention deals primarily with rejection or dissipation of heat from the aforementioned working fluid.

It will be observed that these heat engines and power plants require that the working fluid enthalpy be reduced before recycling thereof to the energy source. The reduction of heat of the working fluid requires a low temperature sink. In space vehicles, the only natural heat sink available is the low temperature of the space environment. Since space is a near perfect vacuum, the heat must be rejected from the vehicle by radiation. Thus, any heat engine for space applications must have a thermal radiator system in its space power system.

Two basic heat systems are conceivable. In the first system, condensation would take place directly in the radiator. In the second system condensation would occur inside a compact heat exchanger and the rejected heat would be transferred to a radiating surface by a circulating liquid coolant.

The former system is feasible for small power conversion systems (below 10 kw.) where vapor headers are negligible in size and vapor passages are not numerous.

However, for large size power conversion systems in the megawatt range, large vapor headers and a large number of flow passages over the radiating surfaces are required. To minimize tube diameter and pressure drop to values required by detail design considerations, a relatively long vapor header would be required feeding many short-length tubes. Thus, for such large megawatt systems, a relatively large size surface area of conduits, would be required when employing the prior art single radiator conduit system.

Where, however, the heat dissipating fluids are distributed over such a large area, and the tubing or ducting is a single radiator system, penetration by a meteor of the tubing would cause a loss of the cooling fluid during the space mission and thus render the power system inoperative. To minimize the occurrence of this possibility, thick shielding protection is required around the ducts. This protection in turn results in heavier radiator structures.

With the present invention, I substantially overcome the problems and difficulties of the prior art by providing a plurality of independent small sized radiator systems which reduces the overall weight of the radiator system, increases the overall radiation area, decreases the possibility of meteoric penetration, maintains the radiation system efficient even if one of the radiator systems is penetrated by meteors and reduces the possibility of a major loss of heat transfer or cooling fluid from the overall system.

It is therefore an object of the present invention to provide improved radiation ssytems for heat engines and the like of space and orbiting vehicles.

It is another object of the present invention to provide an improved radiator system employing a plurality of radiating heat exchangers.

It is still another object of the present invention to provide an improved radiation system including a plurality of independent heat exchangers having a larger heat radiating surface than a comparable single radiator system.

A further object of the present invention is to provide a radiator system for space and orbiting vehicles which minimizes the effects of meteoric penetration on the operation of the system.

A still further object of the present invention is to provide improved methods for removing heat from engines and power plants of space and orbiting vehicles.

These and other objects, features and advantages of the present invention will become more apparent from a careful consideration of the following detailed description when considered in conjunction with the accompanying drawings which illustrate preferred embodiments of the present invention, and wherein like reference numerals and characters refer to like and corresponding parts throughout the several views.

FIGURE 1 is an illustration of an orbiting vehicle having a power plant that includes a radiator system constructed in accordance with the principles of the present invention;

FIGURE 2 is a schematic illustration of the radiator system for the power plant;

FIGURE 3 is a sectional view taken along the line III—III of FIGURE 1;

FIGURE 4 is a sectional view taken along the line IV—IV of FIGURE 1; and

FIGURE 5 is a schematic illustration of the radiator system for the power plant.

As shown on the drawings:

The apparatus illustrated in FIGURE 1 includes an orbiting vehicle generally indicated by the numeral 10 which is provided with a capsule 11 and a power plant 12. The capsule 11 may be a conventional type that includes instruments, etc.

The power plant 12 includes a condenser 13 that has attached thereto a plurality of radially extending radiation surfaces 14, 15 and 16 which define in cross section a Y-shaped configuration as shown in FIGURE 3. Each of the radiation surfaces 14–16 includes a network of tubes which carry a liquid coolant for the condenser 13.

With specific reference to FIGURE 2, the condenser 13 is preferably cylindrical in design and has a plurality of small diameter tubes 17 which transport the working fluid for the power plant. Also disposed in the condenser 13 are a plurality of coolant tubes 18 and a "thermal bond" material 25. Each of the tubes 18 is connected to one of the tubes 19 that is fastened to the radiating surfaces 14–16 and, along with a pump 20, form separate radiating heat exchangers. In operation, the working fluid for the power plant to be cooled is passed through the tubes 17 where it is cooled due to the heat transfer through the material 25 to the tubes 18. The coolant fluid passing through the tubes 18 is circulated by the pump 20 through the tubes 19 attached to the radiation surfaces 14–16.

With specific reference to FIGURES 1, 3 and 4, each radiation surface 14–16 has, in the embodiment of the invention illustrated, two complete loops which have separate fin surfaces. For example, the radiating surface 14 has two loops 21 and 22 which are on separate parts of the radiating surface 14 except where they intercept. As is clearly shown in FIGURES 3 and 4 the radiating surfaces 14–16 are relatively thin while the portions of the surface surrounding the tubes are built up to form heavier walls which protect the tubes against penetration by meteors. Each set of radiating surfaces and tubes radiate heat from both sides. At the points of intersection of the tubes, indicated by the numeral 26, the surfaces are built up to a still greater thickness to permit the tubes to pass.

As shown in FIGURE 1, the loops 21 and 22 run through the condenser 13, through a central support 23 and then through the radiating surfaces 14–16. The central structure 23 should be heavy enough to shield the tubes against meteors and it can also act as a connecting link between the capsule 11 and the power plant 12. The tubes for the liquid coolant are preferably sinuous in the condenser 13 and on the radiating surfaces 14–16 in order to obtain maximum heat dissipation.

With reference to the schematic illustration in FIGURE 5, the plurality of pumps 20 may be of a conventional design, such as gear pumps, which are independently under the influence of a control unit 24. This control unit is provided to maintain the circulation and the rate of circulation of the coolant through the conduits. The control unit 24 may be made responsive to the temperature of the working fluid and be connected to control the operation of the pumps 20.

If desired, additional coolant tube loops and radiating surfaces (not shown) may be employed if it is desired to either permit operation of the system at full power in the event any one of the six illustrating radiator units fails due to, for example, meteoric penetration. These additional radiation units and radiating surfaces (not shown) may be activated by the unit 24 in response to a predetermined temperature increase of the working fluid.

The surfaces 14–16 may be constructed of beryllium and the coolant tubes may be constructed of stainless steel. The radiator coolant fluid may be an organic coolant, Nak, or any other well known material which is compatible with the system.

Thus, if any one of the radiator units is rendered inoperative as a result of meteoric penetration, the remaining systems are sufficient to effectively remove heat from the working fluid of the engine or power plant. If, for example, two additional independent and closed loop radiator units are employed, it can be shown that for eight separate radiators having a total area of 1¼ times the area of a single radiator system, with the survival probability for each of the eight units of 89.3%, that such a survival probability results in a further probability of 95% that six of the units would be operating at the end of one year. These results indicate that meteoric protection shields need only be thick enough to protect the units with ⅛ of the area of a single large radiator system with a 95% probability of survival. The resulting weight of the eight units, thus, is considerably less than the single radiator unit when compared on this basis. It can further be shown that a single radiator system with its area protected to a 95% probability of zero penetration by meteors in one year would weigh 1397 lbs. whereas eight radiator units, each having ⅛ of the area of the single radiator area and a 89.3% probability of survival, would weight only 765 lbs. for the same total zero penetration probability as a result of the requirement for thinner shielding protection.

Thus, with the present invention, the overall weight of radiating systems in space power plants may be reduced, such a power plant may be put into orbit with a substantially smaller booster system, the probability of meteoric penetration is reduced, and a larger total radiation area may be provided with a plurality of independent radiator units.

Although various minor modifications of the present invention will become readily apparent to those skilled in the art, it should be understood that I wish to embody within the scope of the patent warranted hereon all such embodiments as reasonably and properly come within the scope of my contribution to the art.

I claim as my invention:

1. A radiator system adapted to remove heat generated by air borne and space vehicles and the like comprising: a plurality of separate and operatively independent cyclic radiator units in heat exchange relation with the same source of heat generated by the vehicle, a condenser receiving the source of heat, closed loop conduit means in each of said units passing through the condenser for circulating a fluid cooling medium in such a manner that the cooling medium is in heat exchange relation with the said source of heat in the condenser, radiating means receiving the heated cooling medium for removing heat therefrom, and means for controlling the flow rate of the cooling medium.

2. A radiator system adapted to remove heat generated by air borne and space vehicles and the like comprising: a condenser receiving a source of heat from the vehicle, a plurality of separate and operatively independent cyclic radiator units in heat exchange relation with the source of heat in the condenser, each of said units including closed loop conduit means communicating with the condenser to circulate a fluid cooling medium in such a manner that the cooling medium is in heat exchange relation with the said source of heat in the condenser when said cooling medium is in a condition to absorb the greatest amount of heat from said source, radiating surface members in contact with said conduit means for receiving the absorbed heat therefrom, and means for circulating the cooling medium.

3. A radiator system adapted to remove heat generated by air borne and space vehicles and the like comprising: a condenser receiving a source of heated working fluid from the engine or power plant of the vehicle, a plurality of separate and operatively independent cyclic radiator units in heat exchange relation in the condenser with the heated working fluid, each of said units including closed loop conduit means communicating with the condenser to circulate a fluid cooling medium in such a manner that the cooling medium is in heat exchange relation with the working fluid when the cooling medium is in a condition to absorb the greatest amount of heat from said working fluid, a plurality of radiating fins on the vehicle, each of said fins carrying a portion of the conduit means of one of the radiator units for removal of heat from the cooling medium, and means for controlling flow of the cooling medium.

4. A radiator system adapted to remove heat generated by air borne and space vehicles and the like comprising: a condenser receiving a source of heated working fluid from the engine or power plant of the vehicle, a plurality of separate and operatively independent cyclic radiator units in heat exchange relation in the condenser with the heated working fluid, each of said units including closed loop conduit means communicating with the condenser to circulate a fluid cooling medium in such a manner that the cooling medium is in heat exchange relation with the working fluid when the cooling medium is in a condition to absorb the greatest amount of heat from said working fluid, a plurality of radiating fins on the vehicle, each of said fins carrying a portion of the conduit means of one of the radiator units for removal of heat from the cooling medium, means for controlling flow of the cooling medium, and shielding members for said conduit means to prevent meteoric penetration of the conduit means.

5. A radiator system adapted to remove heat generated by air borne and space vehicles and the like comprising: a condenser receiving a source of heated working fluid from the engine or power plant of the vehicle, a plurality of separate and operatively independent cyclic radiator units in heat exchange relation with the heated working fluid in the condenser, each of said units including closed loop conduit means passing through the condenser to circulate a fluid cooling medium in such a manner that the cooling medium is in heat exchange relation with the working fluid when the cooling medium is in a condition to absorb the greatest amount of heat from said working fluid, a Y-shaped fin member carried by the vehicle, means for controlling flow of the cooling medium, and shielding members which support said conduit means, on each of said conduit means to minimize meteoric penetration of the conduit means.

6. A heat rejection system adapted to remove heat generated by air borne and space vehicles and the like comprising: a condenser, a plurality of working fluid conduits mounted in said condenser, a plurality of separate and operatively independent coolant conduits mounted in said condenser, a heat transfer material in said condenser surrounding said working fluid conduits and said coolant conduits, a plurality of fin members carried by the vehicle, a plurality of separate and operatively independent radiator conduits mounted on said fin members, said plurality of radiator conduits being connected to said coolant conduits in said condenser, and means for shielding said radiating conduits in order to minimize meteoric penetration of said radiating conduits.

7. A heat rejection system adapted to remove heat generated by air borne and space vehicles and the like comprising: a condenser, a plurality of working fluid conduits mounted in said condenser, a plurality of separate and operatively independent coolant conduits mounted in said condenser, a heat transfer material in said condenser surrounding said working fluid conduits and said coolant conduits, a plurality of fin members carried by the vehicle, a plurality of separate and operatively independent radiator conduits mounted on said fin members, said plurality of radiator conduits being connected to said coolant conduits in said condenser, and means for shielding said radiating conduits in order to minimize meteoric penetration of said radiating conduits, and means for controlling the flow of a cooling medium through the radiating conduits.

8. A radiator system adapted to remove heat generated by air borne and space vehicles and the like comprising: a plurality of separate and operatively independent cyclic radiator units in heat exchange relation with the same source of heat generated by the vehicle, a condenser receiving the source of heat, each of said radiator units including closed loop conduit means having a portion passing through said condenser for circulating a fluid cooling medium in such a manner that the cooling medium is in heat exchange relation with said source of heat in the condenser, a Y-shaped fin member carried by the vehicle, a portion of said closed loop conduit means in each of said units being mounted on said fin member for removing heat therefrom, each branch of said Y-shaped fin member having mounted thereon conduit means for two of said radiator units.

9. A radiator system adapted to remove heat generated by air borne and space vehicles and the like comprising: a plurality of separate and operatively independent cyclic radiator units in heat exchange relation with the same source of heat generated by the vehicle, a condenser receiving the source of heat, each of said radiator units including closed loop conduit means having a portion passing through said condenser for circulating a fluid cooling medium in such a manner that the cooling medium is in heat exchange relation with said source of heat in the condenser, a Y-shaped fin member carried by the vehicle, a portion of said closed loop conduit means in each of said units being mounted on said fin member for removing heat therefrom, each branch of said Y-shaped fin member having mounted thereon conduit means for two of said radiator units, and means for controlling the flow rate of the cooling medium.

10. A radiator system adapted to remove heat generated by air borne and space vehicles and the like comprising:
 a condenser receiving a source of heated working fluid from the vehicle,
 a plurality of separated and operatively independent closed loop conduit means adapted to each circulate a separate fluid cooling medium,
 each closed loop conduit means having first conduit and second conduit portions,
 said first conduit portions passing through the condenser and being in communication with the heated working fluid to receive heat therefrom and transfer the heat to the coolant therein,
 said second conduit portions being connected to said first conduit portions to receive the heated coolant therefrom and being spaced from the condenser,
 radiating surfaces connected to said second conduit portions,
 said second conduit portions adapted to transfer heat to said radiating surfaces, and
 means to circulate the coolants through the closed loop conduits.

11. A radiator system adapted to remove heat generated by air borne and space vehicles and the like comprising:
 a condenser receiving a source of heated working fluid from the vehicle,
 a plurality of separated and operatively independent closed loop conduit means adapted to each circulate a separate fluid cooling medium,
 each closed loop conduit means having first conduit and second conduit portions,
 said first conduit portions passing through the condenser and being in communication with the heated working fluid to receive heat therefrom and transfer the heat to the coolant therein, said second conduit portions being connected to said first conduit portions to receive the heated coolant therefrom and being spaced from the condenser, a plurality of radiator fin members connected to the vehicle, at least two second conduit portions connected to each fin member to transfer heat thereto, and means to circulate the coolants through the closed loop conduits.

References Cited by the Examiner

UNITED STATES PATENTS

| | | | |
|---|---|---|---|
| 1,500,668 | 7/1924 | Church | 123—41.29 |
| 2,160,397 | 5/1939 | Brammer | 244—134 |
| 2,257,108 | 9/1941 | Cornwall | 180—6.48 |
| 2,690,002 | 9/1954 | Grenell | 244—134 |
| 2,796,743 | 6/1957 | McFarlan | 62—435 |
| 2,915,296 | 12/1959 | Johnson | 165—170 |

FERGUS S. MIDDLETON, *Primary Examiner.*